United States Patent
Kim et al.

(10) Patent No.: US 10,963,732 B2
(45) Date of Patent: Mar. 30, 2021

(54) METHOD AND APPARATUS FOR STEREO MATCHING

(71) Applicant: Samsung Electronics Co., Ltd., Suwon-si (KR)

(72) Inventors: Jiyeon Kim, Hwaseong-si (KR); Minsu Ahn, Yongin-si (KR); Young Hun Sung, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 298 days.

(21) Appl. No.: 15/602,838

(22) Filed: May 23, 2017

(65) Prior Publication Data

US 2018/0150723 A1  May 31, 2018

(30) Foreign Application Priority Data

Nov. 29, 2016 (KR) .......... 10-2016-0160579

(51) Int. Cl.
*G06K 9/62* (2006.01)
*G06T 7/593* (2017.01)

(52) U.S. Cl.
CPC ......... *G06K 9/6204* (2013.01); *G06K 9/6215* (2013.01); *G06T 7/593* (2017.01); *G06T 2207/10012* (2013.01)

(58) Field of Classification Search
CPC .... G06K 9/6204; G06K 9/6215; G06T 7/593; G06T 2207/10012
See application file for complete search history.

(56) References Cited

U.S. PATENT DOCUMENTS

| | | |
|---|---|---|
| 9,224,060 B1 | 12/2015 | Ramaswamy |
| 2012/0213450 A1 | 8/2012 | Shirley et al. |
| 2014/0153816 A1 | 6/2014 | Cohen et al. |
| 2014/0241612 A1 | 8/2014 | Rhemann et al. |
| 2016/0048726 A1 | 2/2016 | Tang et al. |

FOREIGN PATENT DOCUMENTS

KR  10-2015-0032714 A  3/2015

OTHER PUBLICATIONS

Jiang, Nan, Yufu Qu, and Yueping Li. "Fast sub-pixel accuracy stereo image matching based on disparity plane." 2015 International Conference on Optical Instruments and Technology: Optoelectronic Imaging and Processing Technology. vol. 9622. International Society for Optics and Photonics, 2015. (Year: 2015).*

(Continued)

*Primary Examiner* — Claire X Wang
(74) *Attorney, Agent, or Firm* — NSIP Law

(57) ABSTRACT

Provided is a stereo matching method and apparatus. A stereo matching method includes acquiring detection information based on an edge detection of a first image, determining an edge line and a feature point based on the detection information, sampling a reference pixel from the edge line and the feature point, determining a polygon with the reference pixel as a vertex, predicting a search range comprising a disparity of a pixel within the polygon based on a disparity of the reference pixel, and performing stereo matching of the pixel based on the search range.

19 Claims, 7 Drawing Sheets

(56) References Cited

OTHER PUBLICATIONS

Mokhtarian, Farzin, and Riku Suomela. "Robust image corner detection through curvature scale space." IEEE Transactions on Pattern Analysis and Machine Intelligence 20.12 (1998): 1376-1381. (Year: 1998).*
Gonzales, Rafael C., and Richard E. Woods. "Digital image processing." Chapter 10, pp. 378-425 (2002). (Year: 2002).*
Hariyama, Masanori, et al. "FPGA implementation of a vehicle detection algorithm using three-dimensional information." *Parallel and Distributed Processing, 2008. IPDPS 2008. IEEE International Symposium on. IEEE*, 2008. (5 pages in English).
Liu, Jing, et al. "Efficient stereo matching algorithm with edge-detecting." *Optoelectronic Imaging and Multimedia Technology III*. vol. 9273. International Society for Optics and Photonics, 2014. (7 pages in English).
Extended European Search Report dated Jan. 12, 2018 in corresponding European Patent Application No. 17177503.4 (7 pages in English).
Jiang, Nan et al., "Fast sub-pixel accuracy stereo image matching based on disparity plane", 2015 *International Conference on Optical Instruments and Technology: Optoelectronic Imaging and Processing Technology*, International Society for Optics and Photonics, vol. 9622. Aug. 5, 2015 (9 pages in English).
European Office Action dated Apr. 24, 2019 in counterpart European Patent Application No. 17177503.4 (5 pages in English).

\* cited by examiner 410 420 430

METHOD AND APPARATUS FOR STEREO MATCHING

CROSS-REFERENCE TO RELATED APPLICATIONS

This application claims the benefit under 35 USC § 119(a) of Korean Patent Application No. 10-2016-0160579 filed on Nov. 29, 2016 in the Korean Intellectual Property Office, the entire disclosure of which is incorporated herein by reference for all purposes.

BACKGROUND

1. Field

The following description relates to a method and apparatus for stereo matching.

2. Description of Related Art

A human being may recognize a distance by appropriately matching two images acquired at different locations. In the field of computer visual, stereo matching is used to automate a distance extraction capability of a human being. Stereo matching includes a left image and a right image. The left image and the right image are aligned to achieve an appropriate stereo effect. Corresponding pairs are extracted from an aligned stereo image through stereo matching. Disparities of the corresponding pairs is used to acquire depth information.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a stereo matching method including acquiring detection information based on an edge detection of a first image, determining an edge line and a feature point based on the detection information, sampling a reference pixel from the edge line and the feature point, determining a polygon with the reference pixel as a vertex, predicting a search range including a disparity of a pixel within the polygon based on a disparity of the reference pixel, and performing stereo matching of the pixel based on the search range.

The determining of the edge line and the feature point may include determining continuously distributed pixels among pixels corresponding to the detection information as the edge line, and determining discretely distributed pixels among the pixels corresponding to the detection information as the feature point.

The determining of the continuously distributed pixels may include determining the continuously distributed pixels based on a directivity of pixels present within a distance.

The determining of the edge line and the feature point may include determining continuous pixels as the edge line in response to a number of the continuous pixels in a direction among pixels corresponding to the detection information being greater than a threshold.

The sampling of the reference pixel may include determining a gradient between adjacent pixels on the edge line, and determining the reference pixel among the adjacent pixels in response to a variation of the gradient exceeding a threshold.

The stereo matching method may include adjusting the threshold based on a number of reference pixels.

The sampling may include determining the reference pixel among pixels that constitute the feature point.

The predicting of the search range may include predicting the search range by applying a correction factor to disparities of reference pixels on the edge line in response to the polygon sharing a side adjacent to the edge line with an adjacent polygon.

The predicting of the search range may include calculating a difference between a disparity of a third reference pixel positioned at a vertex angle of a first triangle and a disparity of a fourth reference pixel positioned at a vertex angle of a second triangle, wherein the first triangle and the second triangle share a side formed by a line connecting a first reference pixel and a second reference pixel, applying a correction factor to each of a disparity of the first reference pixel and a disparity of the second reference pixel, in response to the difference between the disparity of the third reference pixel and the disparity of the fourth reference pixel exceeding a threshold, and predicting the search range based on the disparity of the first reference to which the correction factor is applied and the disparity of the second reference pixel to which the correction factor is applied.

The threshold may be determined based on any one or any combination of an area of the first triangle, an area of the second triangle, and a distance between the third reference pixel and the fourth reference pixel.

The stereo matching method may include adding at least one reference pixel to a region in which a density of reference pixels is less than a threshold.

The performing of the stereo matching may include detecting a corresponding pixel of the pixel from a second image that constitutes a stereo image together with the first image, based on the search range, and calculating the disparity of the pixel based on a location of the pixel and a location of the corresponding pixel.

The sampling of the reference pixel may include sampling the reference pixel from the edge line based on a variation of a gradient between adjacent pixels on the edge line exceeding a threshold.

In one general aspect, there is provided a stereo matching apparatus including a processor configured to acquire detection information based on an edge detection of a first image, determine an edge line and a feature point based on the detection information, sample a reference pixel from the edge line and the feature point, determine a polygon with the reference pixel as a vertex, predict a search range including a disparity of a pixel within the polygon based on a disparity of the reference pixel, and perform stereo matching of the pixel based on the search range.

The processor may be configured to determine continuously distributed pixels among pixels corresponding to the detection information as the edge line, and to determine discretely distributed pixels among the pixels corresponding to the detection information as the feature point.

The processor may be configured to determine continuous pixels as the edge line in response to a number of the continuous pixels in a direction among pixels corresponding to the detection information being greater than a threshold.

The processor may be configured to determine a gradient between adjacent pixels on the edge line, and to determine the reference pixel among the adjacent pixels in response to a variation of the gradient exceeding a threshold.

The processor may be configured to predict the search range by applying a correction factor to disparities of reference pixels on the edge line in response to the polygon sharing a line adjacent to the edge line with an adjacent polygon.

The processor may be configured to calculate a difference between a disparity of a third reference pixel positioned at a vertex angle of a first triangle and a disparity of a fourth reference pixel positioned at a vertex angle of a second triangle, wherein the first triangle and the second triangle share a side formed by a line connecting a first reference pixel and a second reference pixel, apply a correction factor to each of a disparity of the first reference pixel and a disparity of the second reference pixel in response to the difference between the disparity of the third reference pixel and the disparity of the fourth reference pixel exceeding a threshold, and predict the search range based on the disparity of the first reference to which the correction factor is applied and the disparity of the second reference pixel to which the correction factor is applied.

The threshold may be determined based on any one or any combination of an area of the first triangle, an area of the second triangle, and a distance between the third reference pixel and the fourth reference pixel.

The processor may be configured to detect a corresponding pixel of the pixel from a second image that constitutes a stereo image together with the first image, based on the search range, and to calculate the disparity of the pixel based on a location of the pixel and a location of the corresponding pixel.

The processor may be configured to determine the edge line, in response to a number of the continuously distributed pixels among pixels corresponding to detection information in a direction exceeding a threshold.

In one general aspect, there is provided a stereo matching apparatus including a sensor configured to capture a stereo image including a first image and a second image, a processor configured to determine an edge line and a feature point based on an edge detection of the first image, to sample a reference pixel from the edge line and the feature point, to determine a polygon with the reference pixel as a vertex, to predict a search range including a disparity of a pixel within the polygon based on a disparity of the reference pixel, to detect a corresponding pixel of the pixel from the second image based on the search range, and to calculate the disparity of the pixel based on a location of the pixel and a location of the corresponding pixel.

Other features and aspects will be apparent from the following detailed description, the drawings, and the claims.

Figure 1:
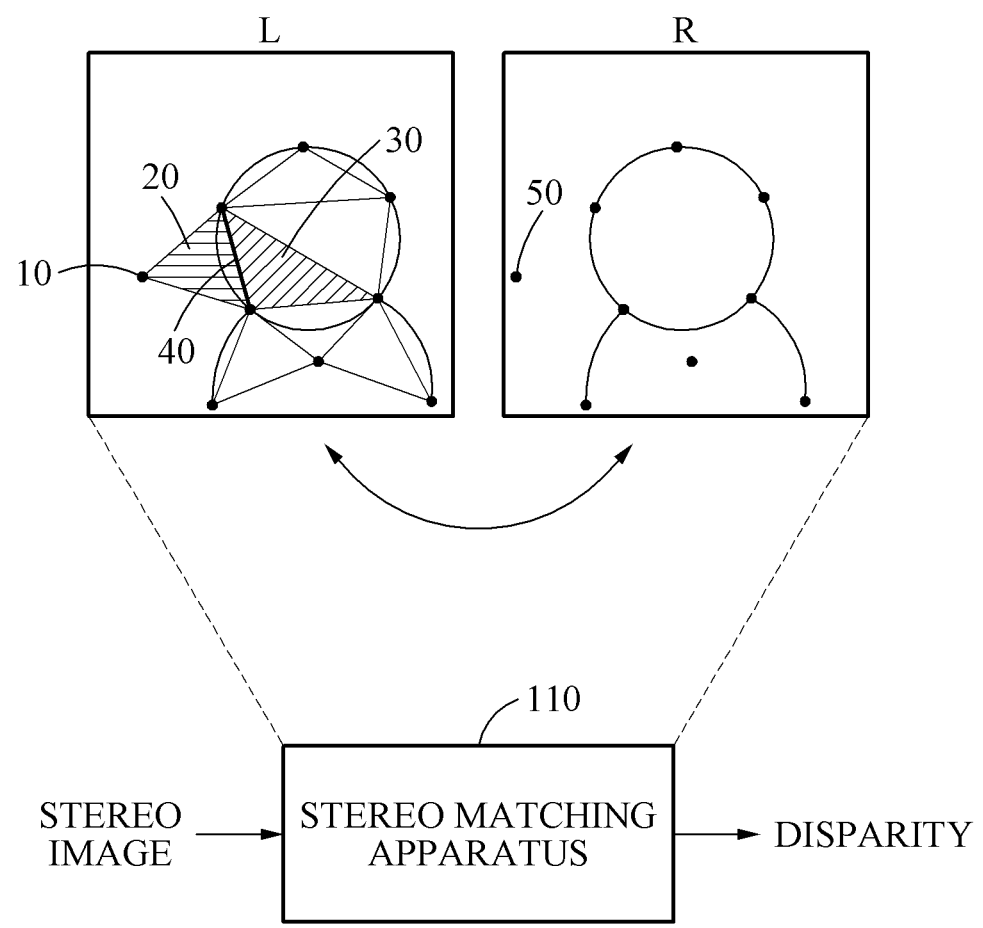
FIG. 1 illustrates an example of a stereo matching process.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Terms such as first, second, A, B, (a), (b), and the like may be used herein to describe components. Each of these terminologies is not used to define an essence, order or sequence of a corresponding component but used merely to distinguish the corresponding component from other component(s). For example, a first component may be referred to a second component, and similarly the second component may also be referred to as the first component.

As used herein, the terms "a,", "an," and "the" are intended to include the plural forms as well, unless the context clearly indicates otherwise.

Hereinafter, reference will now be made in detail to examples with reference to the accompanying drawings, wherein like reference numerals refer to like elements throughout.

FIG. 1 illustrates an example of a stereo matching process. Referring to FIG. 1, a stereo matching apparatus 110 receives a stereo image and outputs disparities associated with pixels included in the stereo image.

The stereo image includes a left image L and a right image R. The stereo matching apparatus 100 detects corresponding pixels of pixels included in the left image L from the right image R, or detects corresponding pixels of pixels included in the right image R from the left image L. Hereinafter, an example in which corresponding pixels are detected from the right image R based on the left image L is described. Corresponding pixels may be detected from the left image L based on the right image R, without departing from the spirit and scope of the illustrative examples described. Also, one of the left image L and the right image R may be referred to as a first image, and the other image may be referred to as a second image.

The stereo matching apparatus 110 detects corresponding pairs from the left image L and the right image R, and calculate disparities of the corresponding pairs. Depth information of an object included in the stereo image may be created based on the disparities. In an example, the depth information is used to render a three-dimensional (3D) image or to measure a distance between a user and the object. For example, an actual object and a virtual object may be mixed in an output image to realize augmented reality (AR). Here, a virtual object may be smoothly disposed between actual objects based on depth information of the actual objects.

The depth information is used by small devices, such as, for example, a mobile device, for various application. The battery capacity and the computing resources for the small device are limited. The examples described herein maintain an accuracy of stereo matching and reduce or minimize an amount of time and resources used for stereo matching.

In an example, disparities of reference pixels corresponding to a portion of pixels included in the stereo image may be calculated through stereo matching using a maximum search range. Once the disparities of reference pixels are calculated, disparities of remaining pixels excluding the reference pixels may be calculated through stereo matching using a predicted search range based on the disparities of reference pixels. The predicted search range is a search range that is reduced compared to the maximum search range. Accordingly, an amount of time and resources used for stereo matching is reduced or minimized.

In an example, disparities may be predicted based on edges, such as, for example, an edge between an object and a background, and an edge between objects. The accuracy of stereo matching may be enhanced. The examples described herein sample reference pixels along contour lines included in an image, recognize pixels adjacent to a boundary showing a sudden depth variation in the contour lines, and dynamically control a search range for stereo matching of the recognized pixels.

The stereo matching apparatus 110 acquires detection information by performing edge detection on a first image. The stereo matching apparatus 110 determines an edge line and a feature point based on the detection information. The detection information may include information about various types of edges acquired through edge detection. For example, edges may be provided in a shape of a straight line, a curved line, a circle, or a point, based on the detection information. The stereo matching apparatus 110 may classify the various types of edges into an edge line provided in a form of a line and a feature point provided in a form excluding the line. The stereo matching apparatus 110 samples reference pixels from the edge line and the feature point. Referring to FIG. 1, the left image L includes reference pixels that include a reference pixel 10.

The stereo matching apparatus 100 detects corresponding pixels of reference pixels from a second image through stereo matching using a maximum search range, and calculates disparities of the reference pixels based on locations of the reference pixels and locations of the corresponding pixels. In an example, the stereo matching apparatus 110 scans a region corresponding to the maximum search range from the right image R using a window of a predetermined size. When the left image L and the right image R are aligned, a y coordinate of the scanned region may be determined from the right image R based on a y coordinate of the reference pixel 10 of the left image L. In response to detecting a corresponding pixel 50 from the right image R, the stereo matching apparatus 110 may calculate a disparity of the reference pixel 10 based on a difference between an x coordinate of the reference pixel 10 and an x coordinate of the corresponding pixel 50.

In an example, the stereo matching apparatus 110 determines a polygon that use reference pixels of the first image as vertices, and predicts a search range that includes disparities of pixels present within the polygon based on disparities of the reference pixels. The left image L includes triangles that use reference pixels as vertices. The triangles may form a triangular mesh. In an example, the left image L shows the triangular mesh on a partial region, the triangular mesh may be formed over the entire region of an image. Examples of using the triangular mesh are described herein. Other types of meshes, such as, for example, a triangle, a rectangle, a pentagon may be formed using the reference pixels without departing from the spirit and scope of the illustrative examples described.

The left image L includes a triangle 20 that is formed using the reference pixel 10 and two other reference pixels. The stereo matching apparatus 110 predicts a search range that includes disparities of pixels present within the triangle 20, based on disparities of reference pixels that constitute vertices of the triangle 20. For example, the stereo matching apparatus 110 may predict the search range that includes the disparities of the pixels present within the triangle 20 through various types of interpolation schemes using disparities of reference pixels that constitute the vertices. In an example, the stereo matching apparatus 110 may predict the search range that includes disparities of pixels present within the triangle 20 using a proportional relation or a statistical scheme, such as an average. In an example, the predicted search range corresponds to a search range that is reduced compared to the maximum search range. Thus, a computation amount is decreased compared to a case in which corresponding pairs of all of the pixels are retrieved from the maximum search range.

In an example, since the search range that includes disparities of remaining pixels is predicted based on disparities of reference pixels, pixels that represents features of the remaining pixels may be sampled as reference pixels.

An edge included in an image may represent a boundary between an object and a background, a boundary between objects, and the like. Accordingly, depth information may vary significantly along the edge used as the boundary. Depth information may vary at a predictable level in a portion excluding the edge. For example, pixels present within the triangle 20 may represent a background and pixels present within a triangle 30 may represent an object based on a line segment 40 that is determined based on the edge. In this case, a discontinuity may be present between a disparity of a pixel present within the triangle 20 and a disparity of a pixel present within the triangle 30. Accordingly, the stereo matching apparatus 110 may determine boundaries of polygons based on edges and may classify pixels included in the image into pixel groups each having a similar depth.

In an example, the stereo matching apparatus 110 predicts the search range based on a reference value different for each pixel group by dynamically adjusting disparities of reference pixels using a correction factor. For example, a search range for stereo matching of a pixel present within the triangle 30 may be calculated based on disparities of three reference pixels that constitute the triangle 30. In an example, a search range for stereo matching of a pixel present within the triangle 20 may be calculated based on disparities of three reference pixels that constitute the triangle 20.

In an example, disparities of reference pixels present on the line segment 40 may correspond to an object, instead of corresponding to a background. A search range predicted for stereo matching of a pixel present within the triangle 20 may not include an actual disparity of the corresponding pixel present within the triangle 20. The stereo matching apparatus 110 may apply the correction factor to disparities of reference pixels present on the line segment 40 so that the search range for stereo matching of the pixel present within the triangle 20 may include the actual disparity of the corresponding pixel.

Accordingly, in an example, a search range for stereo matching of remaining pixels based on disparities of reference pixels is reduced and an accuracy of stereo matching is maintained.

Figure 2:
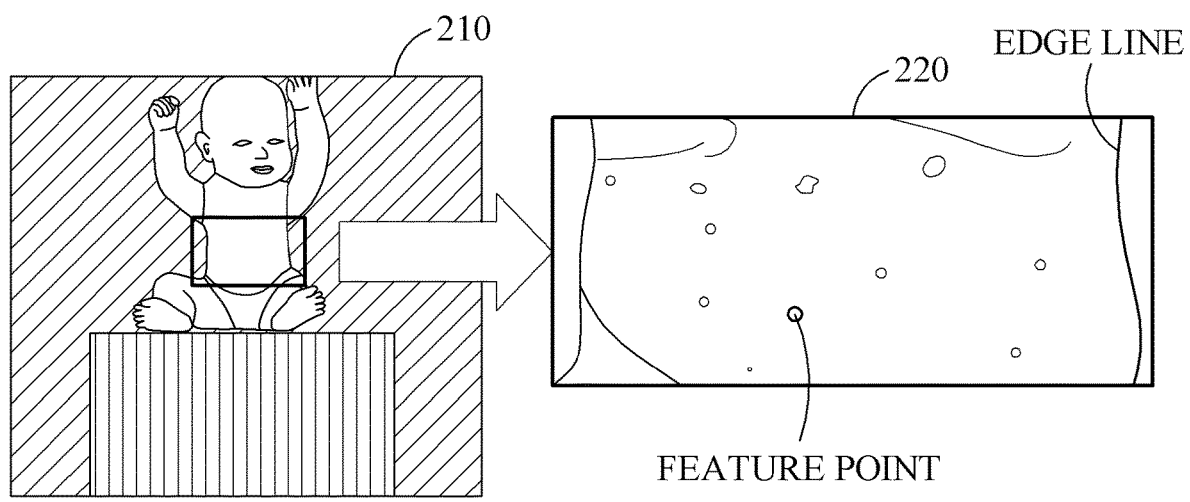
FIG. 2 illustrates an example of an edge line and a feature point.

FIG. 2 illustrates an example of an edge line and a feature point. FIG. 2 illustrates a first image 210 and a detection image 220.

The first image 210 may be one of a left image and a right image. The first image 210 includes objects and a background. The detection image 220 may be acquired by performing edge detection on the first image 210 using methods such as, for example, Canny, Sobel, Prewitt, Roberts, Laplacian, Laplacian of Gaussian (LoG), Difference of Gaussian (DoG), and Compass. The detection image 220 may represent shapes of objects using lines and points, an inner shape of an object, a boundary between objects, and the like. Although the detection image 220 represents an edge included in a partial region of the first image 210, the edge detection may be performed on the entire first image 210. Information included in the detection image 220 may be applied to detection information.

A stereo matching apparatus may classify edges corresponding to the detection information into an edge line or a feature point. For example, the stereo matching apparatus may determine continuously distributed pixels among pixels corresponding to the detection information as the edge line, and may determine discretely distributed pixels among the pixels corresponding to the detection information as the feature point. Referring to the detection image 220, the edge line may represent a shape of an object, a meander within the object, and a boundary between the object and a background. Also, the feature point may represent a protrusion, an indented portion, and the like, within the object. Accordingly, a boundary in which a depth greatly varies in the first image 210 may be mostly specified from the edge line and the feature point. Also, the stereo matching apparatus may sample reference pixels from edge lines and feature points, and pixels having similar depths may be included in a specific polygon. Accordingly, a change in depths of pixels may be predicted based on a shape of the polygonal. The stereo matching apparatus may perform efficient stereo matching of pixels using the polygonal mesh.

Figure 3:
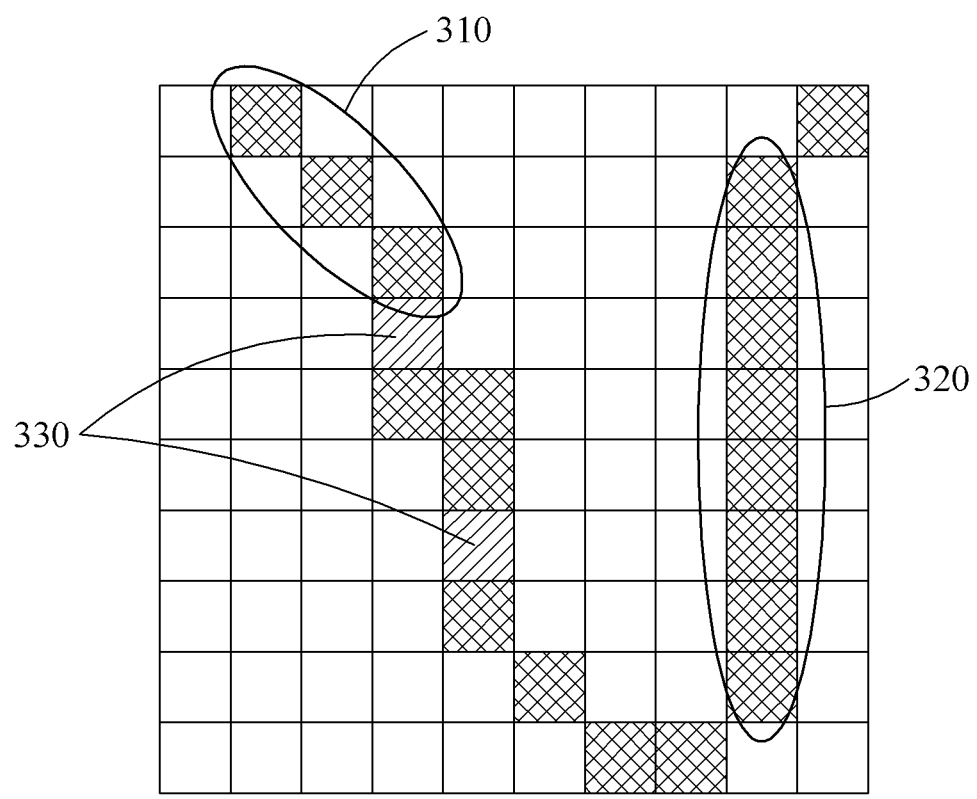
FIG. 3 illustrates an example of a process of determining an edge line.

FIG. 3 illustrates an example of a process of determining an edge line. FIG. 3 illustrates edges included in a portion of a first image.

The stereo matching apparatus may determine continuously distributed pixels among pixels corresponding to detection information as an edge line. In an example, the pixels corresponding to the detection information may indicate pixels that constitute edges included in the first image. In an example, the stereo matching apparatus may determine continuity of pixels based on a distance between the pixels and a direction of an edge. For example, in response to a directivity of pixels present within a distance, the stereo matching apparatus may determine that the corresponding pixels have continuity. Referring to FIG. 3, pixels 310 are adjacent to each other with a distance of one space or less and diagonally distributed, and pixels 320 are adjacent to each other with a distance of one space or less and vertically distributed. Thus, the pixels 310 and the pixels 320 may be determined to have directivity.

Also, the stereo matching apparatus may determine an edge line by comparing a number of continuous pixels and a threshold TH1. If a number of pixels that are continuously distributed in a direction among pixels corresponding to detection information exceeds the threshold TH1, the stereo matching apparatus may determine the corresponding pixels as an edge line. For example, if TH1=2, the pixels 310 and the pixels 320 may be determined as edge lines.

The stereo matching apparatus may connect a pixel to an edge line based on an intensity gradient. In an example, if a pixel that does not belong to an edge is adjacent to an edge line, and if an intensity gradient of the pixel exceeds a threshold TH2, the stereo matching apparatus may connect the pixel to the adjacent edge line. For example, pixels 330 may be regarded as pixels that do not belong to an edge and are adjacent to an edge line. If an intensity gradient of the pixels 330 exceeds the threshold TH2, the stereo matching apparatus may regard the pixels 330 as an edge and may connect the pixels 330 to adjacent edge lines.

Figure 4:
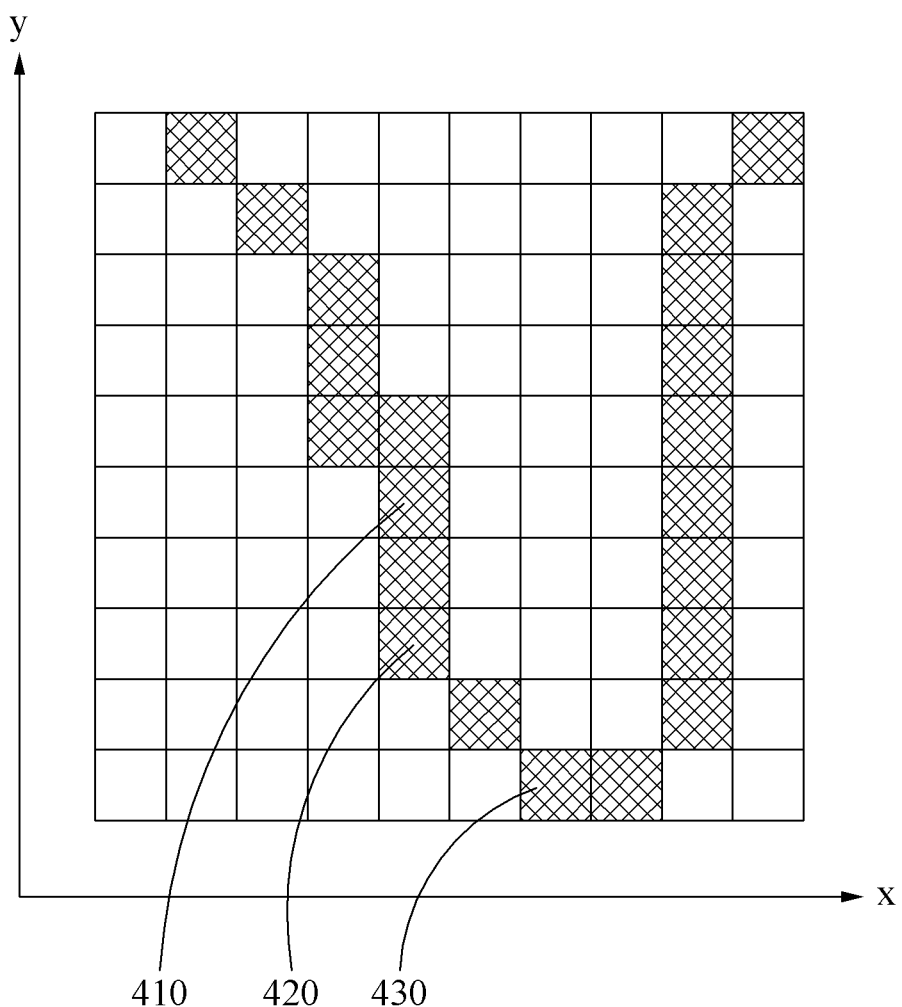
FIG. 4 illustrates an example of a process of sampling a reference pixel from an edge line.

FIG. 4 illustrates an example of a process of sampling a reference pixel from an edge line. FIG. 4 illustrates an edge line included in a portion of a first image.

In an example, the stereo matching apparatus classifies edges corresponding to detection information into an edge line and a feature point. In an example, each of the edge line and the feature point includes a plurality of pixels. The stereo matching apparatus may sample reference pixels from each of the edge line and the feature point. For example, the stereo matching apparatus may determine at least one reference pixel among pixels that constitute the feature point. A number of reference pixels sampled from the feature point may be determined based on an area of the feature point and the number of pixels that constitute the feature point.

Also, the stereo matching apparatus may sample at least one reference pixel among pixels that constitute the edge line. For example, the stereo matching apparatus samples a reference pixel from an edge line based on a turn of the edge line. In an example, the stereo matching apparatus determines a gradient of the edge line and samples a reference pixel from a region in which the gradient significantly varies. The region in which the gradient significantly varies may represent a boundary between objects, a corner of an object, and the like. It may be effective to sample a reference pixel from the region in which the gradient significantly varies.

The stereo matching apparatus may determine a gradient between adjacent pixels separate at a distance. For example, the stereo matching apparatus may determine a gradient between adjacent pixels separate from each other by one space or two spaces. If a difference ($\Delta x$) between x coordinates of the adjacent pixels is greater than a difference ($\Delta y$) between y coordinates of the adjacent pixels, the gradient may be determined as an absolute value of $\Delta y/\Delta x$. If $\Delta x<\Delta y$, the gradient may be determined as an absolute value of $\Delta x/\Delta y$. Also, if $\Delta x=\Delta y$, the gradient may be determined as 1.

If a variation of the gradient exceeds a threshold, the stereo matching apparatus may determine a reference pixel among the adjacent pixels. For example, if a pixel separate by two spaces is an adjacent pixel, a pixel 410, a pixel 420, and a pixel 430 correspond to adjacent pixels. A difference $\Delta x$ between x coordinates of the pixels 410 and 420 is 0 and a difference $\Delta y$ between y coordinates of the pixels 410 and 420 is 2. Thus, a gradient between the pixels 410 and 420 may be determined as 0 that is an absolute value of $\Delta x/\Delta y$. Also, a difference $\Delta x$ between x coordinates of the pixels 420 and 430 and a difference $\Delta y$ between y coordinates of the pixels 420 and 430 are equal as 2. Thus, a gradient between the pixels 420 and 430 may be determined as 1.

A gradient variation among the pixels 410, 420, and 430 may be calculated based on an absolute value of a difference between the gradient between the pixels 410 and 420 and the gradient between the pixels 420 and 430. For example, the gradient between the pixels 410 and 420 is 0 and the gradient between the pixels 420 and 430 is 1. Thus, the gradient variation among the pixels 410, 420, and 430 may be calculated as 1. If a threshold is 0.5, the gradient variation among the pixels 410, 420, and 430 exceeds the threshold. Thus, one of the pixels 410, 420, and 430 may be determined as a reference pixel. In an example, the stereo matching apparatus may determine, as a reference pixel, a pixel positioned on the center among pixels corresponding to a gradient exceeding a threshold. Here, the pixel 420 positioned on the center among the pixels 410, 420, and 430 may be determined as the reference pixel.

The stereo matching apparatus may adjust the number of reference pixels. An interval of a polygonal mesh becomes narrow when there is an increase in the number of reference pixels. Accordingly, an accuracy of stereo matching may be enhanced and a matching speed may decrease. The interval of the polygonal mesh becomes wide when there is a decrease in the number of reference pixels. Accordingly, the accuracy of stereo matching may be degraded and a matching speed may increase. The stereo matching apparatus may adjust the number of reference pixels based on a criterion.

In an example, the stereo matching apparatus adjusts a number of reference pixels based on a density of reference pixels. For example, if a region in which the density of reference pixels is less than a threshold TH3 is present due to a relatively wide interval between feature points, the stereo matching apparatus may add at least one reference pixel to the region. A number of reference pixels to be added may be determined based on the density of reference pixels in the region. Also, reference pixels may be added to the region to be aligned at preset intervals.

In an example, the stereo matching apparatus adjusts the number of reference pixels based on the interval between the reference pixels. For example, if a long edge line having a small gradient variation is present, an interval between reference pixels sampled from the long edge line may be significantly wide. If a region in which an interval between reference pixels exceeds a threshold TH4 is present, the stereo matching apparatus may add at least one reference pixel to the region. A number of reference pixels to be added may be determined based on an interval between reference pixels in the region. If the density of reference pixels is significantly high or if the interval between the reference pixels is significantly close, the stereo matching apparatus may decrease the number of reference pixels.

In an example, the stereo matching apparatus may adjust the thresholds TH3 and TH4 to adjust the number of reference pixels. For example, the stereo matching apparatus may adjust the threshold TH3 based on the density of reference pixels or may adjust the threshold TH4 based on the interval between the reference pixels. The stereo matching apparatus may increase the threshold TH3 to increase the density of reference pixels. The stereo matching apparatus may increase the threshold TH4 to increase the interval between the reference pixels. The thresholds TH3 and TH4 may be determined based on a user setting or a characteristic of an application, such as, for example, a response rate required at the application, and an accuracy required at the application.

Figure 5:
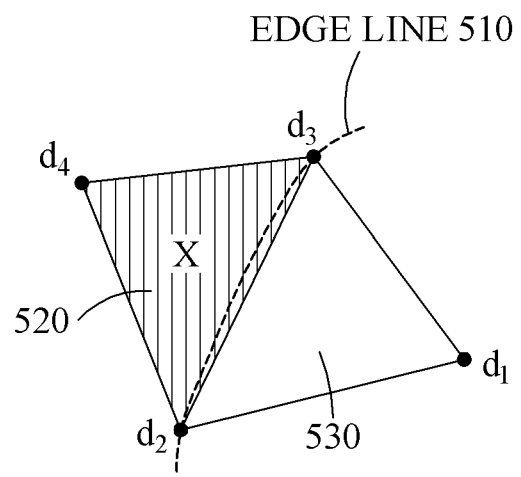
FIG. 5 illustrates an example of a disparity correction process.

FIG. 5 illustrates an example of a disparity correction process. FIG. 5 illustrates reference pixels $d_1$, $d_2$, $d_3$, and $d_4$, an edge line 510, and triangles 520 and 530.

As described above, the reference pixels $d_1$, $d_2$, $d_3$, and $d_4$ may be sampled from the edge line 510 or a feature point. For example, the reference pixels $d_1$ and $d_4$ may be sampled from feature points, and the reference pixels $d_2$ and $d_3$ may be sampled from the edge line 510. The edge line 510 represents a boundary between objects or a boundary between an object and a background. For example, the triangle 520 is positioned on the background and the triangle 530 is positioned on the object, based on the edge line 510. In this example, discontinuity may be present between a disparity of a pixel present within the triangle 520 and a disparity of a pixel present within the triangle 530. The reference pixels $d_2$ and $d_3$ are positioned on the edge line 510. Thus, if a search range for stereo matching of a pixel X positioned on the triangle 520 is predicted based on disparities of the reference pixels $d_2$ and $d_3$, an error may occur. Accordingly, to predict the search range of stereo matching of a pixel within the triangle 520, the disparities of the reference pixels $d_2$ and $d_3$ are to be corrected.

In an example, the stereo matching apparatus determines whether the discontinuity is present between the triangles 520 and 530 based on the edge line 510. When the triangle 520 shares a bottom side adjacent to the edge line 510 with the triangle 530 adjacent to the triangle 520, the stereo matching apparatus determines the search range for stereo matching of a pixel present within the triangle 520 by applying a corrector factor $\alpha$ to the disparities of the reference pixels $d_2$ and $d_3$ positioned on the edge line 510.

The stereo matching apparatus may determine whether the discontinuity is present between the triangles 520 and 530 based on a threshold TH5. If all of the triangles 520 and 530 use, as the bottom side, a line that connects the reference pixels $d_2$ and $d_3$, the stereo matching apparatus may calculate a difference between a disparity of the reference pixel $d_4$ positioned at a vertex angle, for example, a corresponding point of the bottom base, of the triangle 520 and a disparity of the reference pixel $d_1$ positioned at a vertex angle of the triangle 530. If the difference between the disparity of the reference pixel $d_4$ and the disparity of the reference pixel $d_1$ exceeds the threshold TH5, the stereo matching apparatus may apply the correction factor $\alpha$ to each of a disparity of the reference pixel $d_2$ and a disparity of the reference pixel $d_3$. For example, the stereo matching apparatus may correct each of the disparity of the reference pixel $d_2$ and the disparity of the reference pixel $d_3$ as a value between a disparity–$\alpha$ of the reference pixel $d_4$ and a disparity+$\alpha$ of the reference pixel $d_4$.

The line that connects the reference pixels $d_2$ and $d_3$ may be present around the edge line 510. The stereo matching apparatus may predict the search range for stereo matching of the pixel X present within the triangle 520 based on the disparity of the reference pixel $d_2$ to which the correction factor $\alpha$ is applied and the disparity of the reference pixel $d_3$ to which the correction factor $\alpha$ is applied.

In an example, the correction factor $\alpha$ is determined based on a difference between the disparity of the reference pixel $d_2$ or $d_3$ positioned on the edge line 510 and the disparity of the reference pixel $d_4$ positioned at the vertex angle of the triangle 520. For example, a correction factor $\alpha 1$ to be applied to the disparity of the reference pixel $d_2$ may be determined based on a difference between the disparity of the reference pixel $d_2$ and the disparity of the reference pixel $d_4$, and a correction factor $\alpha 2$ to be applied to the disparity of the reference pixel $d_3$ may be determined based on a difference between the disparity of the reference pixel $d_3$ and the disparity of the reference pixel $d_4$.

In an example, the threshold TH5 is determined based on at least one of an area of the triangle 520, an area of the triangle 530, and a distance between the reference pixels $d_1$ and $d_4$. In an example, the difference between the disparity of the reference pixel $d_2$ and the disparity of the reference pixel $d_4$ increases when there is an increase in areas of the triangles 520 and 530 or the distance between the reference pixels $d_1$ and $d_4$. Accordingly, the threshold TH5 may be determined to be a larger value when there is an increase in areas of the triangles 520 and 530 or the distance between the reference pixels $d_1$ and $d_4$.

Figure 6:
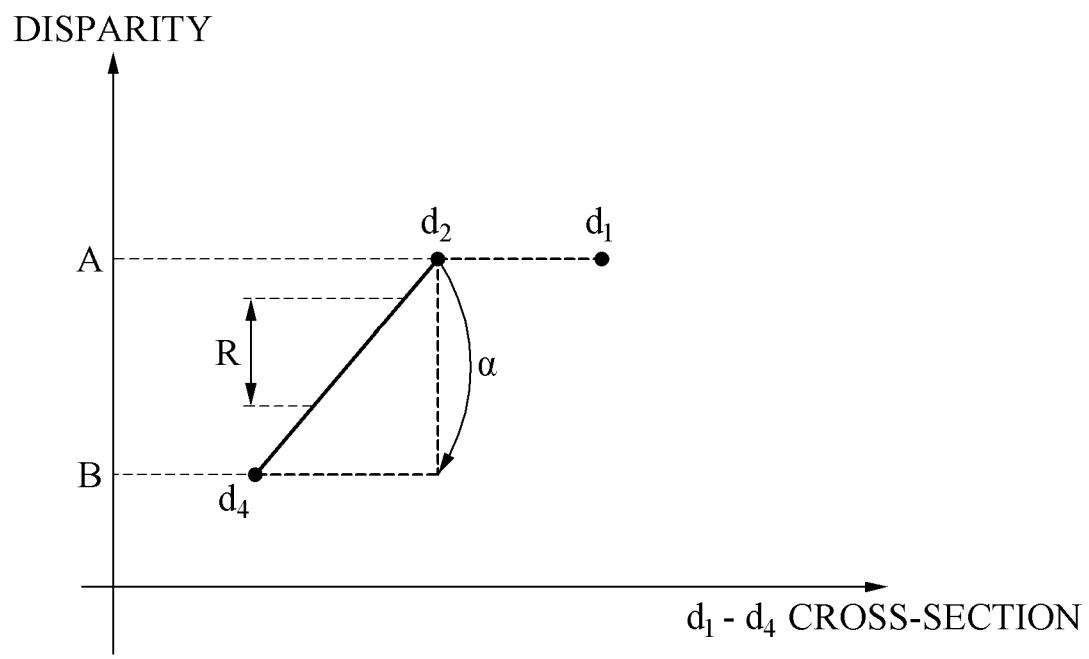
FIG. 6 is a diagram illustrating an example of a disparity correction process.

FIG. 6 is a diagram illustrating an example of a disparity correction process. FIG. 6 illustrates disparities of the reference pixels $d_1$, $d_2$, and $d_4$ of FIG. 5. Although not illustrated in FIG. 6, a disparity of the reference pixel $d_3$ corresponds to the disparity of the reference pixel $d_2$.

It is assumed that the reference pixel $d_1$ is positioned on an object, the reference pixel $d_4$ is positioned on a background, and the reference pixel $d_2$ and the reference pixel $d_3$ are positioned on an edge line between the object and the background. "A" denotes the disparity of the reference pixel $d_1$, the disparity of the reference pixel $d_2$, and the disparity of the reference pixel $d_3$, and "B" denotes the disparity of the reference pixel $d_4$.

If the search range for stereo matching of the pixel X of FIG. 5 is predicted in a state in which the disparities of the reference pixels $d_2$ and $d_3$ are not corrected, the search range for stereo matching of the pixel X may be predicted as a range R between A and B. Without a correction according to discontinuity, a corresponding point of the pixel X may be searched from only within the range R. Thus, the disparity of the pixel X may be determined within the range R.

Since the pixel X is positioned on the background, the disparity of the pixel X is absent within the range R. In this case, the disparities of the reference pixels $d_2$ and $d_3$ are to be corrected based on the discontinuity. For example, the disparities of the reference pixels $d_2$ and $d_3$ may be corrected as a value between B-$\alpha$ and B+$\alpha$ based on the correction factor $\alpha$. In one example, the search range for stereo matching of the pixel X may be predicted as a range that includes B corresponding to an actual disparity of the pixel X. As described above, in an example, an accuracy of stereo matching may be enhanced by correcting a disparity of a reference pixel in a region in which discontinuity may occur.

Figure 7:
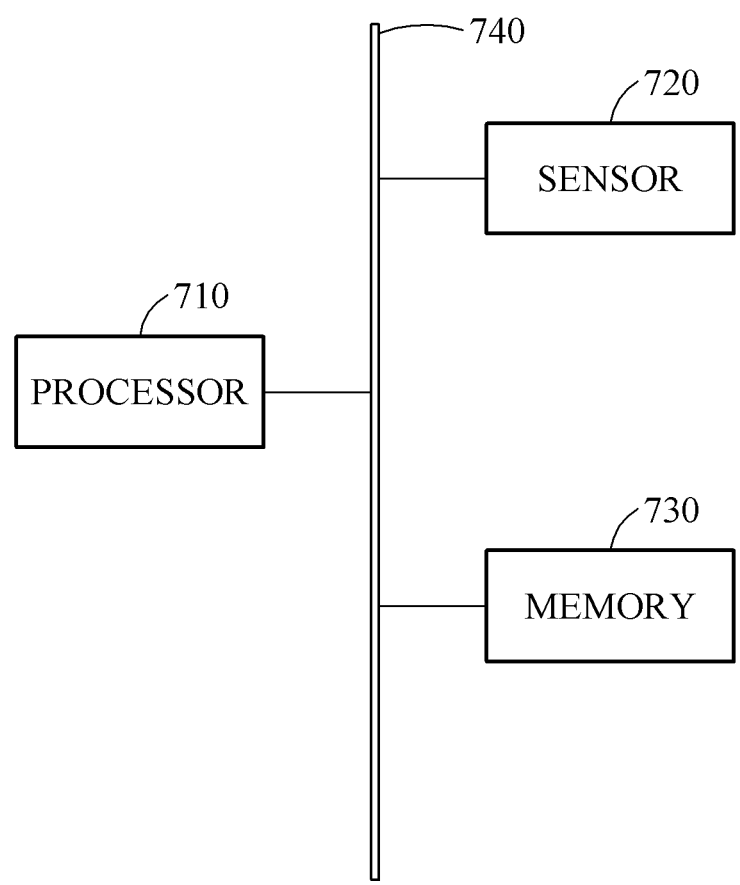
FIG. 7 is a diagram illustrating an example of a stereo matching apparatus.

FIG. 7 is a diagram illustrating an example of a stereo matching apparatus. Referring to FIG. 7, the stereo matching apparatus includes a processor 710, a sensor 720, and a memory 730. The processor 710, the sensor 720, and the memory 730 may communicate with each other through a bus 740.

In an example, the sensor 720 acquires a stereo image. The sensor 720 may include a first sensor configured to acquire a left image and a second sensor configured to acquire a right image. In an example, each of the first sensor and the second sensor is a sensor such as, for example, an image sensor, a proximity sensor, or an infrared ray (IR) sensor. The sensor 720 may acquire the stereo image using a method, such as, for example, a method of converting an optical image to an electrical signal. The sensor 720 transfers at least one of a captured color image, depth image, and IR image to at least one of the processor 710 and the memory 730.

The processor 710 implements at least one of the aforementioned apparatuses or performs at least one of the aforementioned methods. For example, the processor 710 may process an operation associated with the aforementioned stereo matching. In an example, the processor 710 may perform stereo matching of a reference pixel by acquiring detection information based on an edge detection of a first image, by determining an edge line and a feature point based on the detection information, by sampling the reference pixel from the edge line and the feature point, by determining a polygon that uses the reference pixel as a vertex, and by predicting a search range that includes a disparity of a pixel present within the polygon based on the disparity of the reference pixel.

In an example, the memory 730 stores computer-readable instructions and the images captured by the sensor 720. In response to execution of instructions stored in the memory 730 at the processor 710, the processor 710 may perform an operation associated with the aforementioned stereo matching. The memory 730 may store data associated with the stereo matching. For example, the memory 730 may store a stereo image, detection information, information about an edge line, information about a feature point, and information about reference pixels, etc.

The processor 710 may execute instructions or programs, or may control the stereo matching apparatus. The stereo matching apparatus may be connected to an external device, for example, a personal computer (PC) and a network, through an input/output device, and may exchange data. The stereo matching apparatus may be configured as at least a portion of a digital devices such as, for example, an intelligent agent, a mobile phone, a cellular phone, a smart phone, a wearable smart device (such as, for example, a ring, a watch, a pair of glasses, glasses-type device, a bracelet, an ankle bracket, a belt, a necklace, an earring, a headband, a helmet, a device embedded in the cloths), a personal computer (PC), a laptop, a notebook, a subnotebook, a netbook, or an ultra-mobile PC (UMPC), a tablet personal computer (tablet), a phablet, a mobile internet device (MID), a personal digital assistant (PDA), an enterprise digital assistant (EDA), a digital camera, a digital video camera, a portable game console, an MP3 player, a portable/personal multimedia player (PMP), a handheld e-book, an ultra mobile personal computer (UMPC), a portable lab-top PC, a global positioning system (GPS) navigation, a personal navigation device or portable navigation device (PND), a handheld game console, an e-book, and devices such as a high definition television (HDTV), a smart television, an optical disc player, a DVD player, a Blue-ray player, a setup box, robot cleaners, a home appliance, content players, communication systems, image processing systems, graphics processing systems, other consumer electronics/information technology (CE/IT) device, various other Internet of Things (IoT) devices that are controlled through a network, or any other device capable of wireless communication or network communication consistent with that disclosed herein or. The digital devices may be implemented in a smart appliance, an intelligent automobile, and an autonomous driving vehicle including a camera, a vision sensor, an ultrasonic sensor, or a security device for controlling a gate.

The digital devices may also be implemented as a wearable device, which is worn on a body of a user. In one example, a wearable device may be self-mountable on the body of the user, such as, for example, a ring, a watch, a pair of glasses, glasses-type device, a bracelet, an ankle bracket, a belt, a band, an anklet, a belt necklace, an earring, a headband, a helmet, a device embedded in the cloths, or as an eye glass display (EGD), which includes one-eyed glass or two-eyed glasses. The aforementioned description may be applicable to the stereo matching apparatus, and thus, a further description is omitted.

Figure 8:
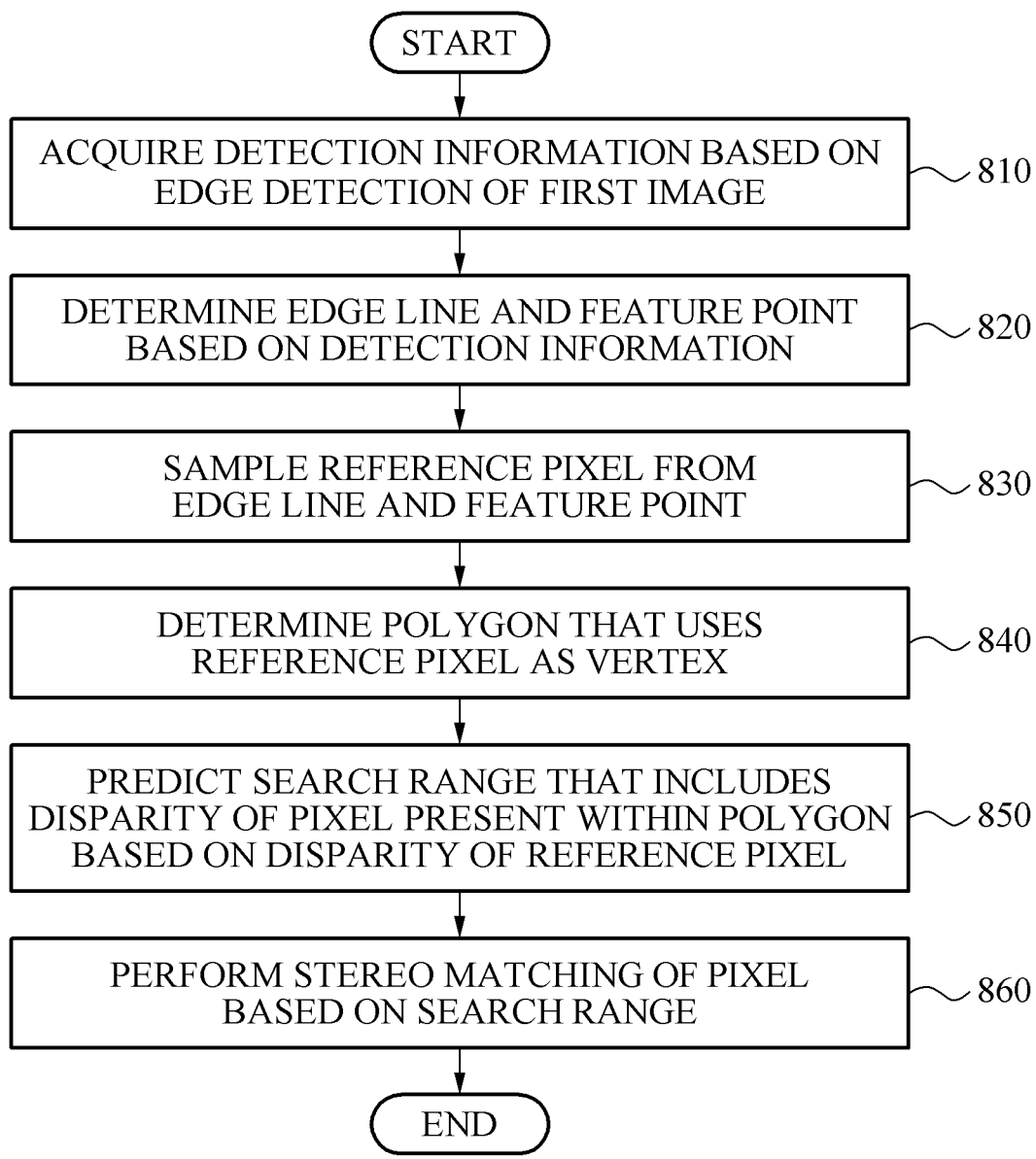
FIG. 8 is a diagram illustrating an example of a stereo matching method.

FIG. 8 is a diagram illustrating an example of a stereo matching method. The operations in FIG. 8 may be performed in the sequence and manner as shown, although the order of some operations may be changed or some of the operations omitted without departing from the spirit and scope of the illustrative examples described. Many of the operations shown in FIG. 8 may be performed in parallel or concurrently. One or more blocks of FIG. 8, and combinations of the blocks, can be implemented by special purpose hardware-based computer that perform the specified functions, or combinations of special purpose hardware and computer instructions. In addition to the description of FIG. 8 below, the above descriptions of FIGS. 1-7 is also applicable to FIG. 8, and are incorporated herein by reference. Thus, the above description may not be repeated here.

Referring to FIG. 8, in 810, the stereo matching apparatus acquires detection information based on an edge detection of a first image. In an example, the stereo matching apparatus detects an edge from an input image. In 820, the stereo matching apparatus determines an edge line and a feature point based on the detection information. In 830, the stereo matching apparatus samples a reference pixel from the edge line and the feature point. In 840, the stereo matching apparatus determines a polygon that uses the reference pixel as a vertex. In 850, the stereo matching apparatus predicts a search range that includes a disparity of a pixel present within the polygon based on a disparity of the reference pixel. The predicted search range may be a search range for stereo matching of the pixel within the polygon. In 860, the stereo matching apparatus performs stereo matching of the pixel based on the search range. For example, the disparity of the pixel may be determined through stereo matching using the predicted search range.

The stereo matching apparatus 110, and other apparatuses, units, modules, devices, and other components described herein with respect to FIGS. 1-8 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. For example, a processor may include multiple processors or a processor and a controller. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIG. 8 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A stereo matching method comprising:
   acquiring detection information based on an edge detection of a first image;
   determining an edge line and a feature point based on the detection information;
   sampling a first to fourth reference pixel from the edge line and the feature point;
   determining a difference between a disparity of the third reference pixel disposed at a vertex angle of a first triangle and a disparity of the fourth reference pixel disposed at a vertex angle of a second triangle, wherein the first triangle and the second triangle share a side formed by a line connecting the first reference pixel and the second reference pixel;
   applying a correction factor to each of a disparity of the first reference pixel and a disparity of the second reference pixel, in response to the difference between the disparity of the third reference pixel and the disparity of the fourth reference pixel exceeding a threshold;
   predicting a search range based on the disparity of the corrected first reference pixel and the disparity of the corrected second reference pixel; and
   performing stereo matching of a pixel in any one of the first triangle or the second triangle based on the search range.

2. The stereo matching method of claim 1, wherein the determining of the feature point comprises:
   determining discretely distributed pixels among the pixels corresponding to the detection information as the feature point.

3. The stereo matching method of claim 2, wherein the determining of the continuously distributed pixels comprise determining the continuously distributed pixels based on a directivity of pixels present within a distance.

4. The stereo matching method of claim 1, wherein the sampling of the first to fourth reference pixel comprises:
   determining a gradient between adjacent pixels on the edge line; and
   determining one or more of the first to fourth reference pixel among the adjacent pixels in response to a variation of the gradient exceeding a threshold.

5. The stereo matching method of claim 4, further comprising:
   adjusting the threshold based on a number of reference pixels.

6. The stereo matching method of claim 1, wherein the threshold is determined based on any one or any combination of an area of the first triangle, an area of the second triangle, and a distance between the third reference pixel and the fourth reference pixel.

7. The stereo matching method of claim 1, further comprising:
   adding at least one reference pixel to a region in which a density of reference pixels is less than a threshold.

8. The stereo matching method of claim 1, wherein the performing of the stereo matching comprises:
   detecting a corresponding pixel of the pixel from a second image that constitutes a stereo image together with the first image, based on the search range; and
   calculating the disparity of the pixel based on a location of the pixel and a location of the corresponding pixel.

9. A non-transitory computer-readable medium storing instructions that, when executed by a processor, cause the processor to perform the method of claim 1.

10. The stereo matching method of claim 1, wherein the determining of the edge line and the feature point comprises:
    determining continuous pixels as the edge line in response to a number of the continuous pixels in a direction among pixels corresponding to the detection information being greater than a threshold.

11. The stereo matching method of claim 1, wherein the sampling of the first to fourth reference pixel comprises sampling the first to fourth reference pixel from the edge line based on a variation of a gradient between adjacent pixels on the edge line exceeding a threshold.

12. A stereo matching apparatus comprising:
    a processor configured to
    acquire detection information based on an edge detection of a first image,
    determine an edge line and a feature point based on the detection information,
    sample a first to fourth reference pixel from the edge line and the feature point,
    determine a difference between a disparity of the third reference pixel disposed at a vertex angle of a first triangle and a disparity of the fourth reference pixel disposed at a vertex angle of a second triangle, wherein the first triangle and the second triangle share a side formed by a line connecting the first reference pixel and the second reference pixel,
    apply a correction factor to each of a disparity of the first reference pixel and a disparity of the second reference pixel, in response to the difference between the disparity of the third reference pixel and the disparity of the fourth reference pixel exceeding a threshold;
predict a search range based on the disparity of the corrected first reference pixel and the disparity of the corrected second reference pixel, and
perform stereo matching of a pixel in any one of the first triangle or the second triangle based on the search range.

13. The stereo matching apparatus of claim 12, wherein the processor is further configured to determine continuously distributed pixels among pixels corresponding to the detection information as the edge line, and to determine discretely distributed pixels among the pixels corresponding to the detection information as the feature point.

14. The stereo matching apparatus of claim 13, wherein the processor is further configured to determine the edge line, in response to a number of the continuously distributed pixels among pixels corresponding to detection information in a direction exceeding a threshold.

15. The stereo matching apparatus of claim 12, wherein the processor is further configured to determine continuous pixels as the edge line in response to a number of the continuous pixels in a direction among pixels corresponding to the detection information being greater than a threshold.

16. The stereo matching apparatus of claim 12, wherein the processor is further configured to determine a gradient between adjacent pixels on the edge line, and to determine one or more of the first to fourth reference pixel among the adjacent pixels in response to a variation of the gradient exceeding a threshold.

17. The stereo matching apparatus of claim 12, wherein the threshold is determined based on any one or any combination of an area of the first triangle, an area of the second triangle, and a distance between the third reference pixel and the fourth reference pixel.

18. The stereo matching apparatus of claim 12, wherein the processor is further configured to detect a corresponding pixel of the pixel from a second image that constitutes a stereo image together with the first image, based on the search range, and to calculate the disparity of the pixel based on a location of the pixel and a location of the corresponding pixel.

19. A stereo matching apparatus comprising:
a sensor configured to capture a stereo image comprising a first image and a second image;
a processor configured to
determine an edge line and a feature point based on an edge detection of the first image,
sample a reference pixel from the edge line and the feature point,
determine a polygon with the reference pixel as a vertex,
predict a search range comprising a disparity of a pixel within the polygon based on a disparity of the reference pixel,
detect a corresponding pixel of the pixel from the second image based on the search range, and
calculate the disparity of the pixel based on a location of the pixel and a location of the corresponding pixel.

* * * * *